(12) United States Patent
Josse et al.

(10) Patent No.: US 6,692,642 B2
(45) Date of Patent: Feb. 17, 2004

(54) ORGANIC SLURRY TREATMENT PROCESS

(75) Inventors: Juan Carlos Josse, Capistrano Beach, CA (US); John William Sutherlin, New Orleans, LA (US)

(73) Assignee: International Waste Management Systems, London (GB)

( * ) Notice: Subject to any disclaimer, the term of this patent is extended or adjusted under 35 U.S.C. 154(b) by 27 days.

(21) Appl. No.: 10/135,118

(22) Filed: Apr. 30, 2002

(65) Prior Publication Data

US 2003/0201225 A1 Oct. 30, 2003

(51) Int. Cl.⁷ ................................ C02F 3/30
(52) U.S. Cl. ............. 210/605; 210/616; 210/621; 210/631; 210/903; 210/906; 71/15; 71/21
(58) Field of Search .................. 210/605, 612, 210/615–617, 621–623, 631, 903, 906; 71/15, 21, 11

(56) References Cited

U.S. PATENT DOCUMENTS

| | | | |
|---|---|---|---|
| 3,994,802 A | * 11/1976 | Casey et al. | 210/605 |
| 4,431,543 A | * 2/1984 | Matsuo et al. | 210/605 |
| 4,460,470 A | * 7/1984 | Reimann | 210/605 |
| 5,076,928 A | * 12/1991 | Ballnus | 210/605 |
| 5,296,147 A | * 3/1994 | Koster et al. | 210/605 |
| 5,759,401 A | * 6/1998 | Boussely et al. | 210/605 |
| 6,063,279 A | * 5/2000 | Yamasaki et al. | 210/605 |

* cited by examiner

*Primary Examiner*—Fred G. Prince
(74) *Attorney, Agent, or Firm*—Stoll, Keenon & Park, LLP

(57) ABSTRACT

A process is provided for full treatment of animal manure and other organic slurries containing suspended solids, and dissolved organic matter, nitrogen, and phosphorus, without the need for anaerobic digestion or anaerobic stabilization lagoons. The process includes: centrifugal decanting, flocculation, dissolved air flotation thickening, centrate heating, acidification in fluidized bed reactor, biological removal of phosphorus, nitrogen and dissolved organic matter in microfiltration membrane bioreactor and disinfection with ultraviolet radiation. The process separates liquids from solids, converts solids into organo-mineral fertilizer pellets, and treats the liquid to dischargeable standards. Land application for effluent disposal is not required because the treatment removes all nutrients.

17 Claims, 4 Drawing Sheets

US 6,692,642 B2

ORGANIC SLURRY TREATMENT PROCESS

TECHNICAL FIELD

This invention pertains to an organic slurry treatment process, which may be used to recover organic matter and nutrients from animal manure slurry, for instance pig slurry, as well as any industrial or agricultural waste with high organic matter and nutrient concentrations.

BACKGROUND ART

Over the last twenty years, and especially in the last five years due to increased regulatory and public pressures placed upon confined animal feedlots and other high-strength waste generators, extensive research has been done in the US, Europe and Japan to develop various processes to treat high-organic waste streams such as pig slurry.

Important patent ed contributions for the treatment animal waste and other high-strength organic waste processes are disclosed in: U.S. Pat. No. 6,346,240 (Moore, Jr.), U.S. Pat. No. 6,221,650 (Rehberger), U.S. Pat. No. 6,007,719 (yoo, et al.), U.S. Pat. No. 5,885,461 (Terault, et al.), U.S. Pat. No. 6,077,548 (Lasseur, et al.), U.S. Pat. No. 6,139,744 (Spears, et al.), U.S. Pat. No. 6,207,507 (White), U.S. Pat. No. 5,013,441 (Goronszy), U.S. Pat. No. 5,277,814 (Winter, et al.), U.S. Pat. No. 6,054,044 (Hoffland, et al.), and U.S. Pat. No. 6,083,386 (Lloyd).

There have been several patents granted for processes that utilize conventional and/or patented technologies and/or processes in novel applications, arrangements and/or combinations. For example, within the field of animal waste treatments the following patents cover some of the treatment processes utilizing conventional technologies: electrochemical treatment (U.S. Pat. No. 6,083,377 (Lin et al.)), ozonation (U.S. Pat. No. 6,117,324 (Greene, et al.)), ozone disinfection (U.S. Pat. No. 6,056,885 (Wasinger)), anaerobic fermentation (U.S. Pat. No. 5,282,879 (Baccarani)), psychrophilic anaerobic digestion (U.S. Pat. No. 5,863,434 (Masse, et al.)), microbiological treatment (U.S. Pat. No. 5,707,856 (Higa)), aerobic systems (U.S. Pat. No. 6,136,185 (Sheaffer)), constructed wetlands (U.S. Pat. No. 6,159,371, (Dufay)), inter alia. Other prior art references are listed under 'References' below.

The organic slurry treatment process according to the present invention combines patented systems and technologies in a way that creates a novel process to treat organic slurries. The synergies created by the specific sequencing of treatment systems in this process maximize treatment capacity and recovery of organic matter and nutrients for use as organo-mineral fertilizer.

SUMMARY OF THE INVENTION

Accordingly, the present invention provides a process for treating an organic slurry comprising a mixture of solids suspended in a liquid, colloidal solids and dissolved pollutants such as nitrogen, phosphorus and organic matter, the process comprising:

flocculating a slurry stream with anionic polymer or a coagulant, or both, to aggregate suspended and colloidal solids into a floc, to form a flocculated stream;

removing flocs from the flocculated stream to form a deflocced stream;

feeding the deflocced stream into a high biomass concentration suspended growth system to remove biologically at least a portion of the organic and inorganic nitrogen, and remove by biological luxury uptake at least a portion of the phosphorus, wherein the system comprises:

a multi-stage sequence of an anaerobic zone, an anoxic zone, and an aerobic zone, each zone separated with baffles, operating in a biomass recycle pattern from the anoxic zone to the anaerobic zone, and from the aerobic zone to the anoxic zone, with biomass wastage from the aerobic zone; and microfiltration membranes to filter liquid out of the aerobic zone to form a low-turbidity permeate.

DISCLOSURE OF THE INVENTION

The approach of the process according to the present invention to organic slurry and manure treatment differs from that of conventional processes, which usually rely on anaerobic digestion. The present organic slurry treatment process is based on effectively separating solids from liquids in the waste slurry stream. Solids are dried and pelletized, and liquid is subjected to physical, chemical, and biological treatment. The treatment of the liquid fraction removes suspended solids, colloidal solids, nitrogen, phosphorus and dissolved organic matter.

Advantageously, the process according to the present invention can eliminate the need for anaerobic digestion, waste lagoons and/or land application when treating animal manure slurries.

Several treatment steps are required to fully treat organic slurries while recovering their organic and nutrient value. First, for treating organic slurries that have high solids content, once slurry waste has been received stored and mixed, solids are separated, preferably using a centrifugal decanter. Solids capture efficiency can be enhanced by cationic polymer addition. In this step the waste stream is divided into a solids and a liquid fraction. The solids fraction, or cake, retains a significant portion of the total amount of solids, organic matter and phosphorus. The liquid fraction or centrate still maintains some particulate and all colloidal and dissolved pollutants.

The solids fraction is dried and pelletized using a direct or indirect continuous heat-drying system and a paddle mixer. This process destroys pathogens and produces hard, uniformly sized and stable pellets for use as organo-mineral fertilizer. On-site drying/pelletizing offers the following advantages: reduces transportation cost, enables heat recovery from the drying process to be used to enhance biological centrate treatment and provides nitrogen-rich condensate. Condensate contains ammonium nitrogen and easily degradable volatile organic matter. The nitrogen present in the condensate in the form of ammonium is recovered using a chemical/physical system consisting of an air stripping packed media tower followed by an acid scrubbing packed media tower. The nitrogen recovered in the form of a concentrated ammonium sulphate solution is used to fortify the nutrient value of the pellets. After ammonium removal, condensate with high dissolved organic matter content is used as a carbon source for denitrification in the biological removal system, as described below.

Alternatively, for treating organic slurries having a low solids content, for example wastewater, the slurry need not be separated initially to remove solids but can be treated directly according to the following process steps.

Suspended and colloidal solids remaining in the centrate, or in low solids slurry such as wastewater, are removed, preferably using dissolved air flotation thickening (DAFT), preceded by flocculation. This process is enhanced with the addition of anionic polymer and coagulant to the flocculation unit.

DAFT effluent is preferably heated to mesophilic temperature, preferably using an indirect tube and shell or plate heat exchanger. Heat for this step is available in return condenser cooling water, which is used to condensate water vapour removed from the solids cake in the drying/pelletizing system. Alternatively, heat can be made available using a water heater operated with liquid or gasfuel. Higher DAFT effluent temperature enhances bacterial metabolism, which increases biological reaction rates in the treatment steps following downstream.

Unless the deflocced stream is readily biodegradable, dissolved complex organic matter and volatile solids in the deflocced stream, for example in heated DAFT effluent, are simplified into short-chain volatile fatty acids (VFA) in a pre-acidification anaerobic fluidized bed reactor (AFBR). AFBR effluent feeds the biological nutrient removal (BNR) system. A high VFA to phosphorus ratio in the BNR feed is required for efficient biological phosphorus removal.

Acidified effluent from the AFBR, or the deflocced stream if readily biodegradable, and preferably also stripped condensate from the ammonium recovery process, are fed to the BNR, which is designed to biologically remove phosphorus and nitrogen, while consuming organic matter simplified to VFA in the AFBR as carbon source for these processes. Carbon requirements for denitrification and phosphorus removal are supplied by VFA available in acidified effluent supplemented by volatile organic matter present in the stripped condensate. BNR treatment rate and efficiency in this process are maximized using submerged microfiltration membranes along with a multi-stage suspended growth biological nutrient removal system. The synergies brought about by this membrane bioreactor/biological nutrient removal (MBR/BNR) combination enable the system to remove efficiently very high dissolved organic matter, nitrogen and phosphorus loads. Additionally, this combination provides high solids retention time, which introduces process stability, reduces biomass production and enables slow-growing organisms, such as nitrifiers, to establish a healthy population. Heavy metals present in the waste stream are also significantly reduced in this system.

The MBR/BNR system comprises a multi-stage Modified Bardenpho configuration with a sequence of at least anaerobic, anoxic and aerobic suspended growth zones, and preferably consists of a five-stage Modified Bardenpho configuration with a sequence of anaerobic, anoxic, aerobic, anoxic and aerobic suspended growth zones. The pattern of biomass recirculation between zones is typical of a conventional University of Cape Town (UCT) process flow. Effective separation of liquid and biomass achieved with microfiltration membranes submerged in the final aerobic zone allows the system to operate with extremely high biomass concentrations and long solids retention times. The liquid passing through the membrane or permeate has no suspended solids, extremely low phosphorus, nitrogen and dissolved organic matter. Microfiltration removes a significant portion of pathogen indicator organisms and produces an effluent with low turbidity. If necessary, the permeate is disinfected using low dosages of ultraviolet radiation prior to reuse as plant service water and discharge.

The combination of the five-stage suspended growth sequence, the biomass recycle pattern, and the microfiltration membranes producing permeate from aerobic zone 2 creates a synergistic effect that enables biological removal of high loads of nitrogen, phosphorus and dissolved organic matter contained in any liquid waste with high concentrations thereof.

BRIEF DESCRIPTION OF DRAWINGS

The invention will be further illustrated by reference to the Figures in the accompanying drawings, in which.

BEST MODE FOR CARRYING OUT THE INVENTION

The treatment sequence and design parameters of the process described in this section are based on typical pig slurry composition and characteristics, as found in pig farms using deep-pit manure accumulation systems. FIGS. 1 through 4 present a diagram of the treatment process. The process sequence includes an on-site indirect heat cake dryer/pelletizer system. The organic slurry treatment process described below is for a centralized pig manure slurry treatment and nutrient recovery plant, in which the manure slurry is hauled to the facility. However, it should be appreciated that the process of the present invention is applicable for other animal waste and organic slurries from industrial or agricultural sources.

In the description below and accompanying Table 1, the process is sized to treat approximately 1,800 $M^3$/day of pig manure slurry with approximately 8 percent dry solids (DS) content and 6 percent suspended solids content. Hydraulic, solids, organic and nutrient loadings are based on this flow. Condensate from solids cake drying is an additional input to the liquid fraction treatment process. Condensate flow and composition are estimated based on producing 200 tons/day of 95 percent DS pellets starting with 760 wet tons of cake at 25 percent DS. The majority of the cake is produced in the organic slurry treatment plant and is a combination of solids present in manure slurry, waste biosolids, and sludge generated in the treatment process. The remainder is municipal sewage sludge cake hauled from a wastewater treatment plant to be dried and pelletized along with the solids generated in the organic slurry treatment process.

The systems comprising the organic slurry treatment process are as follows:

Manure Slurry Reception and Storage

The process is equipped to receive 1,800 tons/day of pig manure slurry collected from pig farms. Manure slurry may be delivered in 30-ton tanker trucks. For example, a total of 60 trucks per day would be required to deliver the slurry. Over a 10-hour per day delivery schedule, the slurry reception area of the plant would handle 6 trucks per hour. All trucks drive over an inbound automatic scale, which records loaded weight and truck information. After unloading, trucks exit over an outbound scale which records empty weight and matches truck identification.

Figure 1:
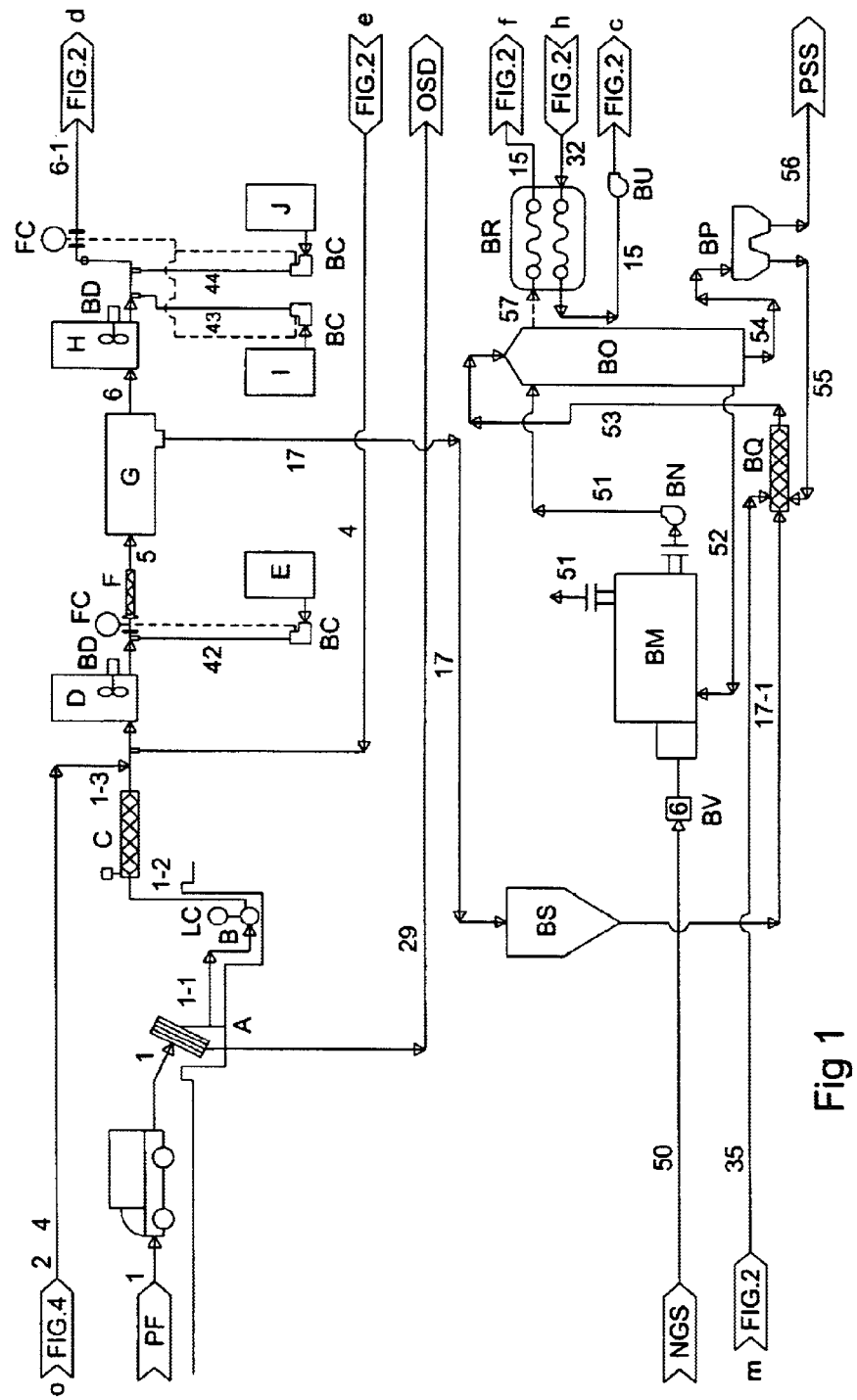
FIGS. 1 through 4 show a process flow diagram corresponding to a pig manure slurry treatment train according to a preferred embodiment of the present invention. The diagram starts in FIG. 1, with raw manure reception, and ends in FIG. 4, with discharge of treated liquid fraction of the slurry. A solids cake heat drying and pelletizing system is depicted in FIG. 1. A condensate nitrogen recovery system is shown in FIG. 2. Components and systems comprising the process are noted with capital letters, and process and auxiliary streams are noted with numbers, as given in the 'Key to Figures' below.

Referring to FIG. 1, slurry 1 is emptied by gravity or pumping into below-grade covered waste pumping pits. Pits are equipped with continuous-cleaning bar racks A with small (e.g., 1-cm) openings to avoid large solids to be pumped into storage and treatment. The bar racks A continuous cleansing mechanism elevates screenings 29 to a conveyor for temporary storage in roll-off containers. Screenings 29 are usually non-manure objects, which are disposed of off-site as solid waste.

Three submersible chopper pumps B installed in the pits pump slurry 1–2 through macerators C, and from there the macerated slurry 1–3 into three 1,500 m³ covered holding tanks D. Solids re-suspension in pumping pits is achieved by re-circulating a portion of the chopper pump effluent to the pit bottom. Pump operation is automatically controlled by slurry level control LC.

Slurry holding tanks D provide over two days of storage time, and are equipped with side-entry mixers BD to maintain the tank contents well mixed and to avoid stratification and solids settling. Mixers BD provide sufficient primary pumping capacity to maintain a superficial velocity of 16 m/h. This is achieved with approximately 20 kW per 1,000 m³ of tank volume. Air space above the slurry level in the holding tanks D is connected to induced-draft fans (not shown) forcing foul air into a wet scrubber chemical odor control system for ammonia, hydrogen sulfide and mercaptan removal.

Centrifugal Decanter Dewatering

Three centrifugal decanters G provide initial solids separation and dewatering to macerated manure slurry 1–3, biological sludges 2 and 4 (see FIGS. 3 and 4), and dissolved air flotation thickener (DAFT) float 26 and bottom draw-off sludge 25 (see FIG. 2, combined sludge 3) produced in the treatment system. Three 60 m³/h decanters G equipped with 75 kW main motors, operate 16 hours/day (two 8-hour shifts) dewatering approximately 2,300 m³/day of combined manure slurry 1–3, biological waste sludges 2, 4, and DAFT float 26 and sludge 25. Sludge produced in the various treatment processes is pumped into the slurry holding tanks D and mixed with incoming slurry to improve slurry de-waterability. Lobe-type positive displacement pumps feed combined slurry and sludge 5 to the decanters.

Polymer blending storage units E and metering units BC add cationic polymer 42 to the decanter feed at a concentration of 2 to 3 g/kg DS. Polymer addition rate is automatically controlled based on flow, by control FC. In-line mixers F enable adequate polymer dispersion in the decanter feed line. The cationic polymer addition enhances solids and phosphorus recovery. Over 85 percent of phosphorus in manure slurry is contained in organic particulate matter and can be removed along with the solids. Biological and chemical sludge also contain high concentrations of phosphorus.

Approximately 18 percent of the decanter G output is solids cake with 25 percent dry solids content 17. The rest exits the decanter as liquid fraction or centrate 6. Combined cake production amounts to approximately 490 tons/day at 25 percent DS. Decanter cake 17 is transported by means of belt conveyors and elevators to storage silos BS, part of the dryer/pelletizer system. Decanters G produce approximately 1,900 m³/day of centrate 6, with approximately 6,600 mg/L of TSS and 1.7 percent of total dissolved solids. Centrifugal decanting with polymer addition retains in the cake the following proportions of pollutants fed to the centrifugal decanter: 44 percent biological oxygen demand (BOD), 69 percent chemical oxygen demand (COD), 91 percent total suspended solids (TSS), 74 percent dry solids (DS), 26 percent total Kjeldahl nitrogen (TKN), and 81 percent total phosphorus (TP).

Centrate 6 is stored in two 1,500 m³ covered tanks H equipped with side-entry mixers BD. Mixers BD provide sufficient primary pumping capacity to maintain a superficial velocity of 12 m/h. This is achieved with approximately 15 kW per 1,000 m³ of tank volume. Air space above the centrate level in holding tanks H is connected to a chemical scrubber odor control system (not shown).

Heat Drying and Pelletizing System

Solids cake 17 from the decanter G is conveyed to storage silos BS and from there fed as cake stream 17-1 with shaft-less conveyor and bucket elevator to a paddle mixer BQ in close proximity of a dryer BO. The system starts with mixing cake 17-1 with recirculated, undersized and crushed oversized pellets 55. The mixture 53 is fed to the top of a vertical multiple tray dryer BO. Hot oil 51 circulates inside the dryer trays and provides indirect heat to the solids. The oil 51 has been heated in a furnace BM using natural gas 50 or liquid fuel. The hot oil is circulated by a pump BN in a closed loop from the furnace BM to the heat exchange trays, and back to the furnace BM in stream 52.

Slow-rotating rakes gently move material radially across the trays achieving uniform exposure to hot tray surface and promoting coating of dry recirculated solids nuclei with wetter cake entering the unit. Multiple parallel trays offer an extremely large heat exchange surface. Pellets 54 collected at the bottom are then screened or separated by size by screening or other means BP. Undersized pellets along with crushed oversized pellets 55 return to the mixer BQ and are reentered into the process. Pellets within size specification 56 are cooled and stored for shipping. Water vapor 57 resulting from drying is extracted from the dryer BO and condensed in an indirect condenser BR. Condensate 15 is pumped to an ammonia recovery system. Non-condensable gases are fed into a gas burner BV.

Sludge Dryer/Pelletizer Condensate Treatment

Figure 2:
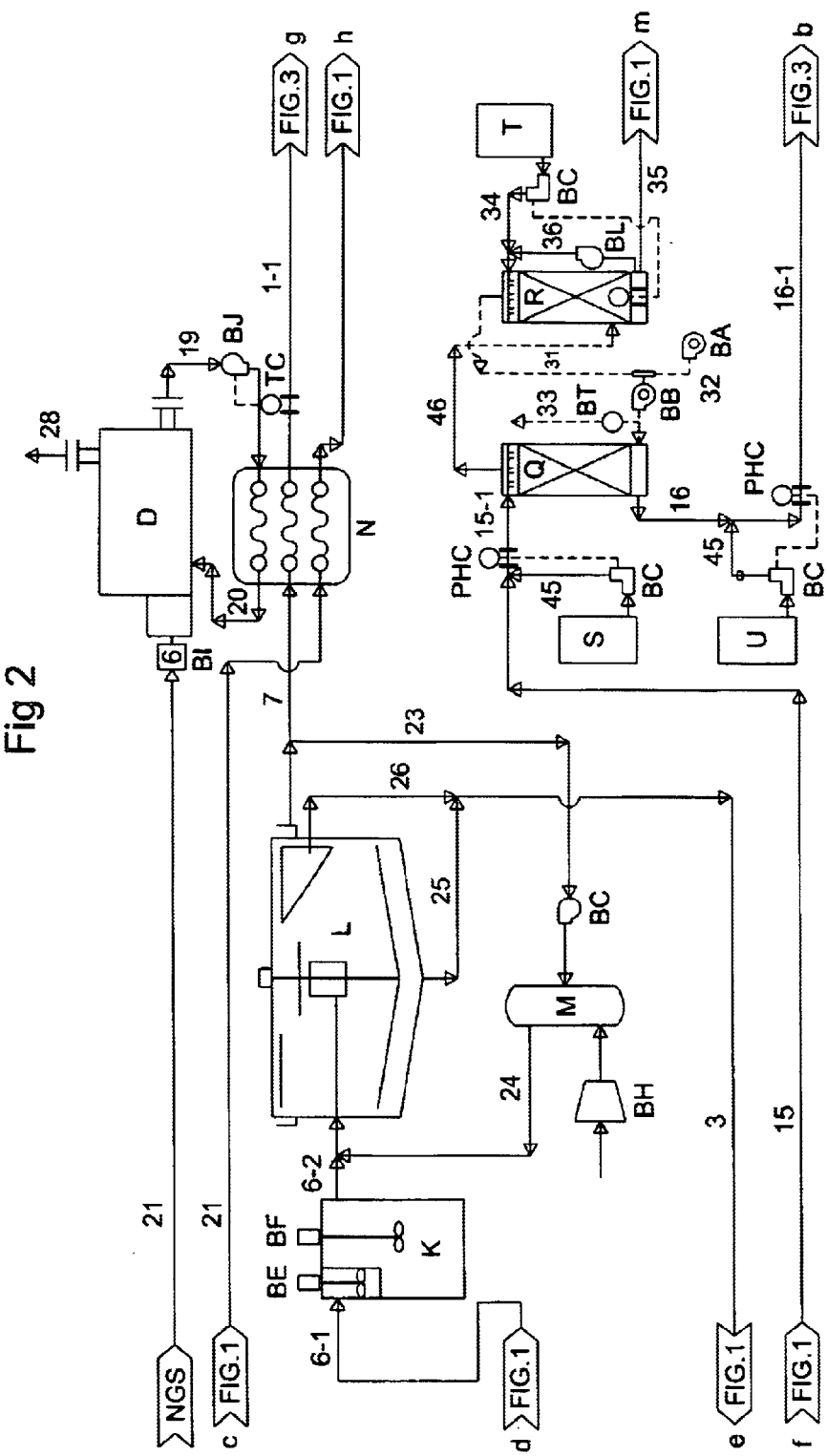

The sludge dryer/pelletizer system produces condensate 15 from water vapor removed from manure and municipal sludge cake 17 in the drying process. This operation produces an estimated 560 m³/day of condensate at 95 degrees Celsius after initial cooling, with approximately 5,200 mg/L of ammonium-nitrogen, 1,500 mg/L of BOD and 50 mg/L of alkalinity as $CaCO_3$. Referring now to FIG. 2, condensate 15 is treated with air stripping towers Q and wet acid scrubbing towers R to remove and recover ammonium-nitrogen prior to feeding into the BNR process. Since the condensate 15 has high temperature and low alkalinity, it is ideal for air stripping.

Air stripper Q and off-gas scrubber R systems installed in series are used to remove and recuperate ammonium from the condensate. The air stripper vessel Q consists of a single stripping stage with an integral sump, mist eliminator, condensate distribution system, and packing media and supports. The packed tower scrubber system R operates on a counter-current mode and consists of a single stage of gas absorption, integral sump, mist eliminator, re-circulation and metering pumps. Air exhaust and make-up air fans and electrical control panel are included to make a complete and functional condensate treatment system.

The condensate stripping/scrubbing system includes a re-circulating air stream 30 and 31 that eliminates almost all ammonia before discharging into the atmosphere. An 8,200 cubic feet per minute (cfm) air exhaust fan BB pulls re-circulating air through the air-stripping tower. In the stripping tower condensate 15-1 at 90 degree Celsius and a pH of 11.5 is sprayed onto a packed bed with 5 m³ of 4-inch random packed media Condensate 15-1 is sprayed via a liquid distributor in a counter-current configuration to transfer the contaminants from the liquid to the air stream. Condensate pH is raised to 11.5 adding sodium hydroxide 45. The caustic addition system includes a storage tank S, a metering pump BC and a pH probe and controller pHC.

Approximately 240 kg/day of sodium hydroxide 45 are added to the condensate 15 to raise the pH. At high pH most ammonium is converted to ammonia gas. At high temperature most ammonia gas is air-stripped out of the condensate, off-gases pass through the stripper mist eliminator and are pushed via the interconnecting ductwork to the packed scrubbing tower R. The condensate 16 is collected at the bottom of the stripper and is immediately drained at 65 degrees Celsius and an ammonium-nitrogen concentration of 250 mg/L. Stripped condensate 16 is pumped to the anaerobic zone V of the BNR process (see FIG. 3). A pH control system consisting of an acid storage tank U, a metering pump BC, and an automated pH controller pHC adds sulfuric acid 46 to the stripped condensate 16 before entering the BNR system as acidified, stripped condensate 16-1.

In the scrubbing tower R, supplemental water with sulfiuic acid 34 recirculating at 48 m$^3$/h 36 by means of a pump BL is sprayed in a counter-current configuration onto a 2 m$^3$ bed, random-packed with 4-inch media via a liquid distributor. The scrubber removes ammonia present in the air stream as ammonium sulfate $(NH_4)_2SO_4$. A pH controller pHC continuously adjusts the injection rate of a sulfuric acid solution 34 from storage tank T by a metering pump BC to match a pH set point of 3. This requires the addition of 6,000 kg/day of sulfuric acid. The scrubber tower R removes over 99 percent of the inlet ammonia. Ammonia in stripper air reacts with sulfuric acid in the scrubber and forms ammonium sulfate, which remains in solution 35.

Finally, a dampener valve BT allows 540 cfm of the scrubbed air 33 with less than 10 parts per million (ppm) of ammonia to be discharged to the atmosphere and the rest is recirculated through the system. Approximately 410 cfm of supplemental air 32 is added to the loop by a separate fan BA. The supplemental air compensates for the discharged air and helps reducing the temperature of the influent to 65 degrees Celsius, the highest temperature allowable for plastic media. The high air-to-water ratio in the stripping tower R, approximately 600 to 1, enables the stripper to operate as a cooling tower.

Ammonium sulfate is used to fortify the nutrient content of pellets 56 (see FIG. 1) by adding concentrated ammonium sulfate solution 35 to the paddle mixer BQ of the pelletizing system. The scrubber recovers approximately 17 ton/day of a 50 percent solution of ammonium sulfate.

Flocculation and Dissolved Air Flotation Thickener (DAFT)

Centrate 6-1 is pumped out of the holding tanks H (see FIG. 1) into two flocculators K at a constant rate of 77 m$^3$/h. Flocculators K are equipped with high-energy flash mixers BE and variable speed paddles BF. Flash mixing BE compartment and flocculation BF compartment have, respectively, 1 minute and 20 minutes of hydraulic retention time. Anionic polymer I and liquid aluminum sulfate (alum) as coagulant J are fed with metering pumps BC (see FIG. 1) into rapid mixers BE operating with a 400 s$^{-1}$ velocity gradient. Flocculator paddles BF provide approximately 90 s$^{-1}$ velocity gradient to enable floc formation. Flocculated centrate 6-2 flows into two DAFTs L. The DAFTs L enable efficient solid/liquid separation by the introduction of fine air bubbles to the wastewater stream. This is achieved by recirculating a portion of the DAFT effluent 23 and pumping it with pump BG into a pressurized air saturation tank M, also fed by an air compressor BH.

Air saturated liquid 24 is fed back into the DAFT center well through a backpressure valve. This releases air bubbles into the DAFT. Micro-bubbles attach to flocculated particles causing a gas-solids matrix. The resulting increased buoyancy of the matrix causes it to rise to the surface of the water, where it is collected as float 26 with mechanical surface skimmers. Flocculated solids, which are too heavy to be floated, settle and are removed as bottom draw-off 25. Combined bottom draw-off and float 3 are collected by gravity in a transfer tank and pumped into the slurry/sludge holding tanks D) (see FIG. 1).

Approximately 350 kg/day of alum J and 70 kg/d of anionic polymer I are added to reach a concentration of approximately 180 mg/L and 36 mg/L respectively. With alum and polymer, the DAFT units L remove over 79 percent of the remaining phosphorus. A small faction of the removal is the result of phosphate reacting with calcium carbonate, magnesium and ammonia present in the centrate and precipitating as hydroxyapatite and struvite.

The DAFT units L are sized to operate under normal flow conditions with a hydraulic loading rate of 1.4 m$^3$/m$^2$-h, and a solids loading rate of 7.6 kg TSS/m$^2$-h. Alum addition produces approxmiately 700 kg TSS/day, which are removed mainly as float. The effective diameter of each DAFT unit is 6.4 m. The air/solids ratio is maintained at 4 percent (weight/weight) and effluent recycle rate at 200 percent of influent flow. Mass capture of pollutants in the float and bottom draw-off is as follows: 59 percent BOD, 59 percent COD, 91 percent TSS, 32 percent TS, and 23 percent TKN.

DAFT effluent 7 flows by gravity into two transfer tanks (not shown), from where it is pumped to the subsequent treatment system at a constant rate of 66 m$^3$/h. Combined DAFT float and bottom sludge production is estimated at 280 m$^3$/day at 4 percent TSS concentration.

DAFT Effluent Heating

Figure 3:
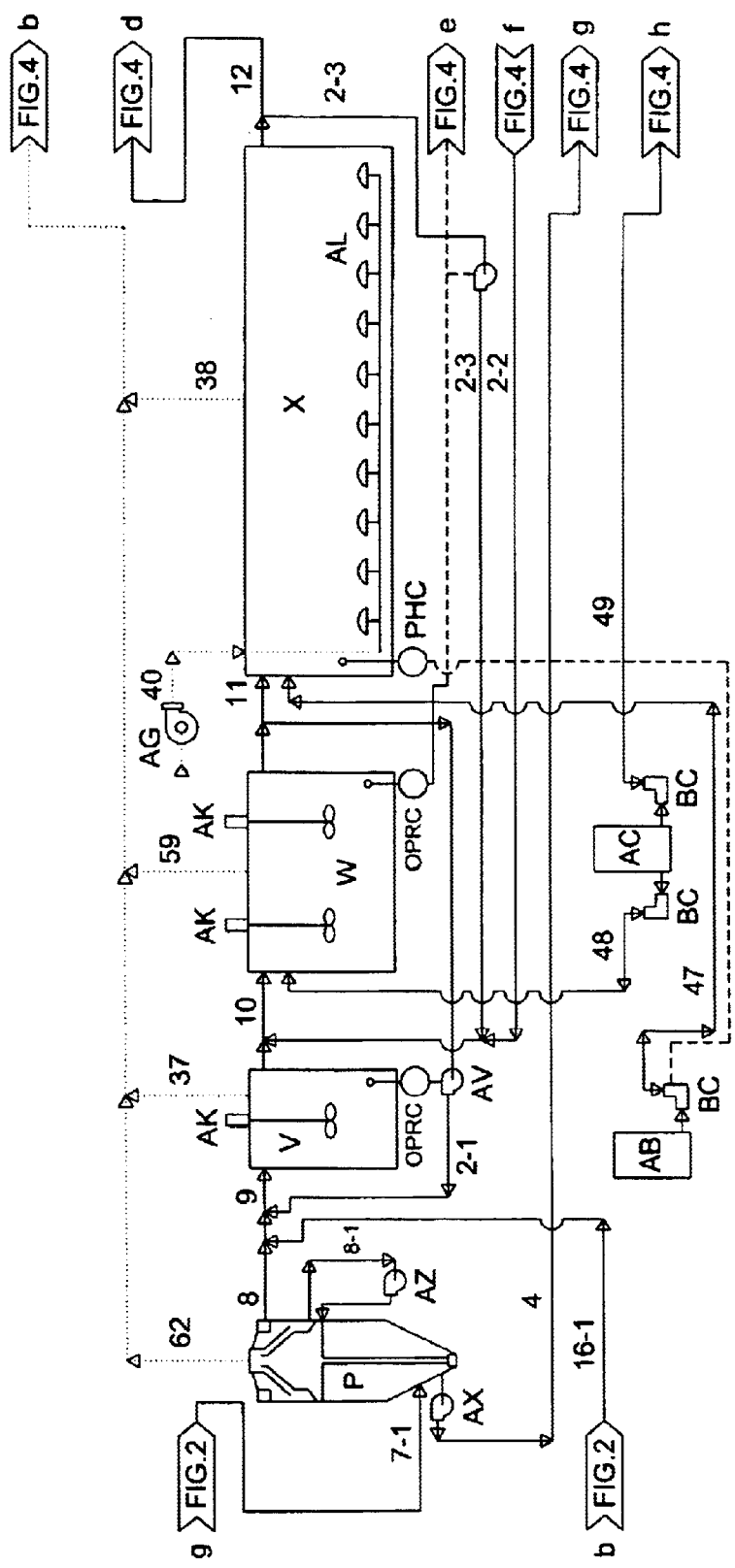

The DAFT effluent 7 is pumped into two pre-acidifying Fluidized Bed Reactors (FBR) P connected in parallel, shown in FIG. 3. Before feeding the FBR, the DAFT effluent 7 is heated passing through two indirect heat exchangers N connected in parallel. Increasing process water temperature enhances bacterial metabolism and kinetic rates in the various biological reactions that take place in downstream treatment systems. The primary heat source is condenser-cooling water 21 pumped by pump BU from indirect water vapor condensers BR utilized in the sludge dryer/pelletizer system (see FIG. 1). Alternatively, a water heater O operated on liquid or gas fuel 27 provides heat to the heat exchangers N. The heat exchangers N are sized to transfer a maximum of 5,500 MJ/h (130 GJ/day), which is sufficient to increase the temperature of 1,600 m$^3$/day by 20 degrees Celsius during wintertime. The objective is to maintain 32 degrees Celsius in the FBR. Estimated average winter and summer DAFT effluent temperatures are 15 and 20 degrees Celsius, respectively. Heated effluent 7-1 is fed into the FBRs P.

Pre-Acidification in Fluidized Bed Reactors (FDR)

Referring now to FIG. 3, in the FBR P volatile suspended solids (VSS) are converted into dissolved organic matter by the action of hydrolizing bacteria present in the fluidized bed. Under low to medium organic loadings and balanced pH, anaerobic degradation of dissolved organic matter, both newly hydrolized and existing dissolved portion takes place in a sequence that starts with acidogenesis, which converts complex organic matter molecules into volatile fatty acids (VFA), and is then followed by methanogenesis. Here, methanogenesis converts organic acids into methane and carbon dioxide.

At high organic loading rates and short hydraulic retention times, as operated in this treatment step, fast growing acidogenic bacteria outgrow methanogens, which cannot consume VFA at the rate it is produced. VFA accumulation also tends to depress pH, unless the waste is well buffered. When methanogenesis is inhibited, VFAs accumulate and COD removal is only marginal. FBRs P act as pre-fermenters to ensure that most particulate and dissolved organic matter available in DAFT effluent 7-1 are converted to short-chain volatile fatty acids (VFA), such as acetic, propionic and butyric acid, before entering the biological nutrient removal (BNR) portion of the treatment process.

Acidification FBRs P are enclosed, 120 m³ conical bottom steel tanks, with a diameter of 5 m and preferably a 60-degree cone angle. The reactors are placed in parallel and contain each a bed with 80 m³ of expanded media. Media are 500-micron (20×40 mesh) activated carbon particles, used as an inert, low specific gravity biofilm carrier. Media covered with acidifying anaerobic bacteria biofilm and entrapped hydrolyzing bacteria are kept fluidized in a bed to about 20 percent of the bed's original volume.

Fluidization is achieved with upflow effluent re-circulation 8-1 provided by an external centrifugal pump AZ. Upflow velocity of 15 m/h in the cylindrical section of the tank is required to fluidize the bed to the required level. This is accomplished with a flow of 260 m³/h, and a recirculation-to-feed ratio of approximately 8 to 1. A solids separator integral to the reactor returns a portion of the solids to the bed via the re-circulation pumps AZ. In the upper portion of the reactors, a low velocity settling area and effluent launderers are provided to reduce effluent suspended solids. The reactors produce excess solids at a rate of approximately 0.014 kg VSS/kg BOD applied, after hydrolysis of reactor-produced VSS. Solids settled in the upper portion of the reactor are accumulated in a submerged trough for removal.

Excess sludge 4 produced in the FBRs P amounts to approximately 20 m³/day at 1 percent TSS concentration. It flows by gravity to an external sludge transfer tank from where it is pumped by pump AX to slurry/sludge holding tanks D. Hydraulic retention time in the expanded beds is approximately 2.4 hours, and solids retention time 9 days. The reactors P achieve expanded bed volatile solids concentrations of 20 kg/m³, and operate at organic volumetric loading rates of 124 kg COD/m³ of expanded bed-day, and specific organic loading rates of 6.2 kg COD/kg VSS-day.

Approximately 11 percent removal of the COD takes place in this unit; however, the BOD to COD ratio increases from 0.69 to 0.90. VFA/COD ratio in FBR inflow is approximately 53 percent. VFA/COD ratio in the effluent is 0.86. This indicates near complete conversion of complex organic molecules to VFA. The reactors achieve TSS removals of 83 percent, slight release of P and no significant TKN removal. Acidified effluent 8 flows by gravity into the anaerobic zone V of the BNR process. Some of the gases produced in the FBR P include hydrogen sulfide, methane and carbon dioxide. These gases are collected as stream 62 and conveyed with a fan to an odor control scrubber.

Microfilration Membrane Bioreactor (MBR) Biological Nutrient Removal (BNR) System Acidification FBR effluent 8 and air stripped condensate 16-1 combine into stream 9 before entering the Microfiltration Membrane Bioreactor (MBR) Biological Nutrient Removal (BNR) system. The MBR/BNR is a suspended growth process operating with 20 g/L mixed liquor suspended solids (MLSS) concentration. It combines biological nitrification/de-nitrification, and enhanced biological phosphorus removal (EBPR) in a single 6,500-m³ concrete tank containing two parallel treatment trains. Side water depth in the tank is 6 meters.

Each parallel train has five compartments, or zones, separated by baffles. Additional baffles are placed within each zone to approximate plug-flow conditions. The treatment sequence and sludge recirculation pattern corresponds to a Modified Bardenpho/University of Cape Town (UCT) multi-stage sludge process, enhanced with the use of submerged microfiltration membranes for biomass/liquid separation.

In conventional sludge BNR systems, biomass separation from treated liquor relies on sedimentation of aggregated mixed microbial flocs in secondary clarifiers. Aggregation is promoted by bacterial excreted exo-cellular polymers, which bind mixed microflora into flocs large enough to settle in a secondary clarifier. Good settling in such systems depends upon maintaining micro-organisms, which produce high levels of exo-cellular polymers. However, this does not produce the most active and select population to uptake or transform the specific pollutants being treated. Thus, conventional activated sludge BNRs do not operate at maximum efficiency.

In MBR, biomass separation from treated effluent is done by physical retention of bacterial biomass by microfiltration membranes submerged in the reactor. Consequently, the need for flocculation is eliminated and a highly active and specific population can be maintained regardless of its flocculating ability, The membrane acts as a filter to provide clarified effluent, and as a consequence, microbial biomass retention time (SRT) becomes independent of hydraulic retention time (HRT).

Operation as a membrane bioreactor has the advantage of allowing MLSS concentrations as high as 20,000 mg/L, compared with 3,000 mg/L of conventional activated sludge bioreactors. This allows increased volumetric loading rates, reduced reactor volume, reduced hydraulic retention time, long solids retention time, and reduced solids production. Permeate (e.g., membrane effluent) contains less than 1 mg/L of TSS and extremely low turbidity. Membranes achieve coliform bacteria reductions of over 6 log orders. Permeate is well suited for further disinfection with ultraviolet (UV) radiation if required, due to its low turbidity.

Figure 4:
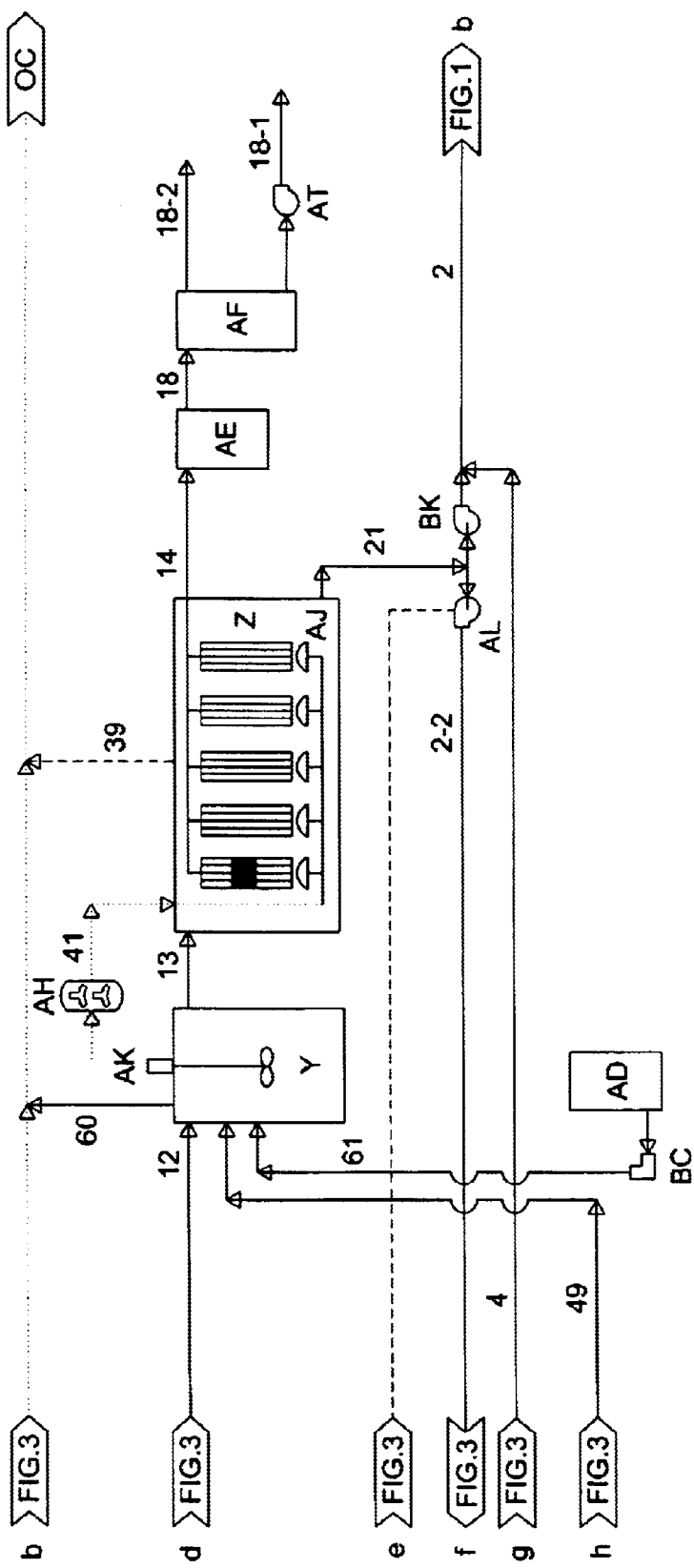

Referring to FIGS. 3 and 4, the five zones of the MBR/BNR system are anaerobic zone V with 500 m³, anoxic I zone W with 1,600 m³, aerobic I zone X with 2,800 m³, anoxic II zone Y with 1,000 m³ and aerobic II zone Z with 600 m³. Mixed liquor from one zone to the next flows across baffle openings. For ease of representation the zones are presented in FIGS. 3 and 4 as separate tanks. Passage from one zone to the next is represented with arrows. Thus, 10 represents the anaerobic to anoxic I zone passage, 11 represents the anoxic I to aerobic I zone passage, 12 represents the aerobic I to anoxic II zone passage, and 13 is the anoxic II to aerobic II passage. All zones are covered and contain positive air suction connected to odour control scrubbers 37, 59, 38, 60 and 39. Overall hydraulic retention time is 3.1 days Internal sludge recirculation from anoxic I (2-4), aerobic I (2-3), and aerobic II zones (2-2) is provided by external open impeller pumps AV, AL and AL. Mixing and oxygen requirements in the aerobic I zone X are supplied by fine-bubble diffuser AI aeration. Coarse-bubble diffusers AJ installed in the lower portion of the submerged microfiltration membrane cases AA in the four separate zones of the aerobic II zone Z provide mixing and oxygen.

Additionally, coarse air bubbles scour the membranes to reduce biological build-up. Positive displacement lobe blowers AH supply air 41 for the aerobic II zone Z, while multi-stage dynamic blowers AG feed air 40 for aerobic I zone X. All zones have foam removal mechanisms. Foam is conveyed to a transfer tank, from where it is pumped to the slurry/sludge holding tank.

Twentyfour flat-plate microfiltration membrane cases located in the aerobic II zone Z provide separation of biomass from liquid. Six cases are submerged in each of four separate zones. A four-zone configuration was selected to maximize membrane filtration capacity during routine maintenance, by enabling 18 cases to remain in operation when membranes in one aerobic II zone are being maintained.

Each case has 200 vertical flat membrane cartridges, each with two 0.4-m² flat membranes, for a total of 0.8 m² of filtration area per cartridge, membranes have a 0.3-micron nominal pore size. Cartridges are separated from each other by a 7 mm gap. Large air bubbles released through 8-mm openings in diffusers placed below the lower section of the cases generate an upward mixed liquor cross-flow of 0.5 m/s along the gap over the membrane surface. Air requirements are 0.35 scfm per cartridge, for a total of 1,700 scfm in aerobic II zone. This airflow supplies mixing liquor flow through the membrane gaps, and oxygen requirements to maintain the zone with 1 mg/L dissolved oxygen concentration. Mixed liquor, cross-flow minimizes fouling and allows low-pressure gravity filtration through the membrane panel and thence to a permeate collection manifold.

Treated effluent flow 14 through the membranes is controlled by available gravity head above membrane cases. Typically 1.5 m of static head provide 3.5 m³/h per case, operating at 20 g/L MLSS. This corresponds to a membrane flux of 0.5 m³/d-m². In-situ chemical cleaning with a backwash of 0.5 percent sodium hypochlorite solution is recommended every six months. This requires approximately 6 hours off-line per zone, while the other three are operating.

Top-entry mixers AK in anaerobic, anoxic I, and anoxic II zones V, W and Y pump mixed liquor in an upflow mode to keep biomass suspended, while reducing surface turbulence. This is accomplished with a mixer primary pumping rate sufficient to provide complete turnover of the zone content every 20 minutes. A power input of approximately 2 kW per 100 m³ is required.

Biomass wastage from the aerobic II zone Z controls the MBR solids retention time. This is accomplished with two waste sludge pumps BK in continuous operation controlled with variable frequency drives (VFD). Waste sludge is transferred to slurry/sludge holding tanks prior to dewatering. The MBR/BNR is operated with an SRT of 41 days. To maintain this SRT biomass is wasted at a rate of 160 m³/day, at a concentration of 20 g/L. Chemical addition into the MBR/BNR includes magnesium hydroxide, methanol and alum. Magnesium hydroxide 47 is added to aerobic I zone X for pH and alkalinity control, and some minor orthophosphate and ammonium removal using a storage tank AB with a stirrer, metering pump BC, and pH probe and controller pHC sensing pH in aerobic I zone X.

Methanol is added to anoxic I zone 48 and anoxic II zone 49 as supplemental carbon source for denitrification. The addition system consists of a storage tank AC and metering pumps BC. Feed rates are manually controlled. Liquid alum 61 is added to anoxic II zone Y for residual phosphorus removal. The addition system consists of a storage tank AD and a metering pump BC. Feed rates are controlled manually.

Nutrient and organic matter removal along in the system takes place as follows. Most nitrogen is removed by pre-denitrification in anoxic I zone W, and by post-denitrification in anoxic II zone Y. Design nitrate-nitrogen loading for complete denitrification at 32 degrees Celsius range is approximately 6 kg/d of nitrate-nitrogen per m³ of anoxic reactor at 20 g/L MLSS, provided there is no carbon limitation. Denitrifying heterotrophic bacteria in the anoxic zones require a carbon source (electron donor) to convert nitrate to nitrogen gas, as well as for maintenance and growth. Most of the required carbon is contained in the acidified flow feeding the MBR, however, approximately 9 tons/day of supplemental methanol are required. Anoxic II zone Y downstream provides additional de-nitrification. In this zone, the denitrification rate is driven by the endogenous respiration oxygen demand of the mixed liquor, supplemented by added methanol 49. Approximately 1 ton/day of methanol is required. Excess carbon is consumed in the final aerobic II zone Z.

For de-nitrification to occur, ammonium-nitrogen contained in the waste must be first oxidized to nitrate (nitrified). Nitrification occurs in aerobic I zone X, downstream of anoxic I zone W. Nitrified liquor is recycled (FIGS. 3, 2–3) from the aerobic I zone X to the anoxic I zone W at a rate of 5 times the flow through the MBR (Q). Recycle flow rates are controlled automatically with VFD-driven pumps governed by oxidation/reduction potential (ORP) inputs measured in the anoxic I zone W by controls ORPC. Nitrification of residual ammonium escaping the aerobic I zone X occurs in aerobic II zone Z.

Design ammonium-nitrogen loading for complete nitrification at 32 degrees Celsius is 2.8 kg $NH_4$-$N/m^3$ of aerobic reactor at 20 g/L MLSS. Oxygen requirement for nitrification is usually 4.6 g $O_2$/g $NH_4$—N, which results in 35 ton $O_2$/day. Oxygen transfer rates of up to 1 kg $O_2/m^3$-h are common in high-MLSS nitrification systems. In the case of aerobic I zone, this would yield over 67 ton $O_2$/day transferred. Actual oxygen transfer efficiency using fine-bubble diffusers, 6-meter side water depth, and 32 degrees Celsius is 13 percent. The oxygen requirements for complete nitrification at the design ammonium-nitrogen loading of 3 kg $NH_4$-$N/m^3$ in this zone is supplied with 24,000 standard cubic feet per minute (scfm) of air. This air flow covers liquor mixing requirements, and maintains a mixed liquor dissolved oxygen concentration of 2 mg/L.

Bacterial nitrification consumes approximately 7.1 g of alkalinity per g of ammonium-nitrogen nitrified, while de-nitrification produced approximately 3.2 g per g of nitrate-nitrogen converted to nitrogen gas. The net alkalinity loss of 30 tons/day, about 3.9 g/g N removed is partially covered by the 20 tons/day of alkalinity contained in the liquid. The difference, approximately 10 ton/day, is supplemented with 5.2 ton/day of magnesium hydroxide 47.

Mixed liquor 2-2 recycle rate from aerobic II zone Z into anoxic I zone W is 1Q, and is controlled by ORP measured in anoxic I zone W. Mixed liquor recycle 2-4 to the anaerobic zone V is only done from the end of anoxic I zone W to minimize input of nitrate-bound oxygen in the anaerobic zone V, which must remain strictly anaerobic to enable growth of poly-P bacteria and phosphorus release. Estimated return rate is 2Q, and is also controlled by ORP measured in the anaerobic zone V by control ORPC.

Biological phosphorus (P) removal in the biological nutrient removal (BNR) system is accomplished providing an initial anaerobic zone with high concentrations of readily available (short-chain) dissolved organic matter. Readily available substrate such as VFA produced in the pre-acidification FBR enable polyphosphate-accumulating (poly-P) bacteria to develop in the BNR system. Poly-P bacteria in anaerobic conditions store VFA in the cell as polyhydroxybutyrate (PHB), and release phosphate contained in the cell adenosine triphosphate (ATP), nucleotides such as nicotinamide dinucleotide (NAD), and nucleic material such as ribonucleic acid (RNA) and deoxyribonucleic acid (DNA). The extent of initial phosphate release achieved in the anaerobic BNR zone is directly proportional to the VFA-to-P ratio in the inflow to the anaerobic zone. The sequence of anaerobic, anoxic and aerobic zones provides the environment necessary to achieve luxury phosphorus uptake. Under aerobic conditions poly-P biomass stores excess phosphorus to be used as an energy source during stressed anaerobic conditions Phosphorus storage in the aerobic I zone X of the BNR system is proportional to phosphate release in the anaerobic zone V. The ratio of VFA-exerted BOD to P in the influent to the anaerobic zone is nearly 50 to 1. P is released at a specific rate of 0.02 kg P/kg of anaerobic volatile suspended solids (VSS)-day. BOD uptake in the anaerobic zone V occurs at a rate of 1.3 moles of acetate per mol of P released. Approximately 160 kg P/day are released in the anaerobic zone V. This is equivalent to 5,100 moles of P. BOD uptake is approximately 6,600 moles of acetate or 400 kg BOD/d. Approximately 16,200 kg/d of BOD remain available after anaerobic uptake by poly-P bacteria. Most of this BOD is in the form of VFA, which greatly reduces methanol requirement for pre-denitrificaton in the anoxic I zone W, downstream of the anaerobic zone V.

Excess phosphorus stored in poly-P bacteria during aerobic conditions can be as high as 15 percent dry mass of the mixed liquor volatile suspended solids (MLVSS) if no volatile solids digestion occurs due to excessive solids retention time. Phosphorus is removed from the system as part of the waste activated sludge 2 pumped from aerobic II zone Z. Approximately 88 percent of the phosphorus entering the MBR is removed biologically, leaving a concentration of approximately 20 mg/L in the anoxic II zone Y. This phosphorus is chemically removed, adding approximately 400 kg/d of alum 61 in the anoxic II zone Y. Aluminum reacts with dissolved phosphate to form aluminum phosphate microflocs, which are retained by the membranes and removed with waste sludge. All sludge removed from the MBR is stored and mixed in the slurry/sludge holding tanks D prior to feeding the centrifugal decanters. Permeate 14 passing the membranes contains 12 mg/L BOD. 87 mg/L COD, less than 1 mg/L TSS, 1 percent TDS, 8 mg/L TN, 1.5 mg/L TP, and 530 total coliform bacteria colonies per 100 mL.

Ultraviolet Light Disinfection and Effluent Discharge

MBR permeate stream 14 flows by gravity into an ultraviolet (UV) light radiation disinfection system AE. UV is a physical disinfecting agent. Radiation with a wavelength of 254 nanometers (nm) produced by mercury lamps penetrates the cell wall of microorganisms and is absorbed by cellular material including DNA and RNA, which either prevents replication or causes cell death. Water with low turbidity has also high transmittance, which greatly reduces radiation intensity requirements and makes UV disinfection more efficient. The system AE comprises two enclosed medium-pressure lamp UV chambers in parallel sized to produce 30,000 microwatts per second per $cm^2$ and operating at 1,000 $m^3$/day each. Disinfected effluent 18 total coliform bacteria concentration is reduced from 500 to 5 colonies per 100 ml. A transfer tank receives disinfected effluent (not shown) and pumps it to an effluent holding tank AF, from where it is pressurized by pump AY for yard/service water use in the plant as stream 18-1. Excess effluent 18-2 overflows the tank and is discharged to a receiving stream.

Table 1 shows exemplary pollutant concentrations, loadings and removals in a pig manure slurry treatment in accordance with the present invention:

TABLE 1

| STREAM | (1) RAW SLURRY | | (2) WASTE BIO-SLUDGE | |
|---|---|---|---|---|
| DAILY FLOW ($m^3$/d) | 1,800 | | 160 | |
| HOURLY FLOW ($m^3$h) | 180 (10-h/day) | | 18 | |
| CONSTITUENT | CONC (mg/L) | LOAD (kg/d) | CONC (mg/L) | LOAD (kg/d) |
| BOD | 29,000 | 52,200 | 9,000 | 1,440 |
| COD | 78,700 | 141,660 | 18,000 | 2,880 |
| TSS | 55,900 | 100,620 | 20,000 | 3200 |
| TS | 79,300 | 142,740 | 32,000 | 5,120 |
| TKN | 7,000 | 12,600 | 800 | 128 |
| $NH_4$—N | 6,000 | 10,800 | 2 | 0 |
| $NO_3$—N | 0 | 0 | 5 | 1 |
| TP (as $P_2O_5$—P) | 3,800 | 6,840 | 2,125 | 340 |
| Chloride | 5,489 | 9,880 | 4,409 | 705 |
| Total Coliform (#/100 mL) | 5.30E + 09 | — | — | — |
| Fecal Coliform (#/100 mL) | 2.12E + 09 | — | — | — |
| STREAM | (3) FLOAT/CHEM SLUDGE | | (4) ACID. FBR SLUDGE | |
| DAILY FLOW ($m^3$/d) | 280 | | 20 | |
| HOURLY FLOW ($m^3$h) | 12 | | 1 | |
| CONSTITUENT | CONC (mg/L) | LOAD (kg/d) | CONC (mg/L) | LOAD (kg/d) |
| BOD | 23,000 | 6,440 | 10,119 | 202 |
| COD | 45,000 | 12,600 | 17,960 | 359 |
| TSS | 40,000 | 11,200 | 10,000 | 200 |
| TS | 63,900 | 17,892 | 28,073 | 561 |
| TKN | 5,500 | 1,540 | 5,558 | 111 |
| $NH_4$—N | 5,880 | 1,646 | 4,866 | 97 |
| $NO_3$—N | 2 | 1 | 0 | 0 |
| TP (as $P_2O_5$—P) | 4,700 | 1,316 | 214 | 4 |
| Chloride | 4,409 | 1,235 | 4,409 | 86 |
| Total Coliform (#/100 mL) | — | — | — | — |
| Fecal Coliform (#/100 mL) | — | — | — | — |
| STREAM | (5) CENTRIFUGE FEED | | (6) CENTRATE | |
| DAILY FLOW ($m^3$/d) | 2,260 | | 1,853 | |
| HOURLY FLOW ($m^3$/h) | 141 16-h/day | | 77 | |
| CONSTITUENT | CONC (mg/L) | LOAD (kg/d) | CONC (mg/L) | LOAD (kg/d) |
| BOD | ta 26,584 | 60,080 | 18,056 | 33,462 |
| COD | 69,531 | 157,140 | 26,169 | 48,495 |
| TSS | 50,894 | 115,020 | 5,649 | 10,469 |
| TS | 73,342 | 165,752 | 23,323 | 43,221 |
| TKN | 6,313 | 14,288 | 5,682 | 10,530 |
| $NH_4$—N | 5,507 | 12,447 | 5,397 | 10,002 |
| $NO_3$—N | 1 | 1 | 1 | 1 |
| TP (as $P_2O_5$—P) | 3,759 | 8,496 | 837 | 1,551 |
| Chloride | 5,269 | 11,908 | 5,269 | 9,765 |
| Total Coliform (#/100 mL) | — | — | — | — |
| Fecal Coliform (#/100 mL) | — | — | — | — |
| STREAM | (7) DAF EFFLUENT | | (8) ACID. FBR EFFLUENT | |
| DAILY FLOW ($m^3$/d) | 1,573 | | 1,553 | |
| HOURLY FLOW | 66 | | 65 | |

TABLE 1-continued

| CONSTITUENT | CONC (mg/L) | LOAD (kg/d) | CONC (mg/L) | LOAD (kg/d) |
|---|---|---|---|---|
| BOD | 8,745 | 13,757 | 10,119 | 15,717 |
| COD | 12,492 | 19,653 | 11,243 | 17,463 |
| TSS | 565 | 889 | 100 | 155 |
| TS | 18,638 | 29,322 | 18,173 | 28,227 |
| TKN | 5,114 | 8,045 | 4,858 | 7,546 |
| NH$_4$—N | 4,965 | 7,812 | 4,866 | 7,558 |
| NO$_3$—N | 3 | 5 | 10 | 16 |
| TP (as P$_2$O$_5$—P) | 204 | 321 | 214 | 333 |
| Chloride | 5,269 | 8,289 | 5,269 | 8,184 |
| Total Coliform (#/100 mL) | — | — | — | — |
| Fecal Coliform (#/100 mL) | — | — | — | — |

| STREAM | (9) COMBINED BNR FEED | | (10) ANAEROBIC SUPERNATANT | |
|---|---|---|---|---|
| DAILY FLOW (m³/d) | 2,113 | | 2,113 | |
| HOURLY FLOW (m³/h) | 88 | | 88 | |
| CONSTITUENT | CONC (mg/L) | LOAD (kg/d) | CONC (mg/L) | LOAD (kg/d) |
| BOD | 7,835 | 16,557 | 7,646 | 16,157 |
| COD | 9,499 | 20,072 | 9,269 | 19,587 |
| TSS | 73 | 155 | 30 | 10 |
| TS | 13,437 | 28,395 | 13,437 | 28,395 |
| TKN | 3,650 | 7,714 | 3,630 | 7,671 |
| NH$_4$—N | 3,646 | 7,104 | 3,636 | 7,683 |
| NO$_3$—N | 7 | 16 | 2 | 4 |
| TP (as P$_2$O$_5$—P) | 163 | 344 | 239 | 504 |
| Chloride | 3,839 | 8,114 | 3,839 | 8,114 |
| Total Coliform (#/100 mL) | — | — | — | — |
| Fecal Coliform (#/100 mL) | — | — | — | — |

| STREAM | (11) ANOXIC 1 SUPERNATANT | | (12) AEROBIC 1 SUPERNATANT | |
|---|---|---|---|---|
| DAILY FLOW (m³/d) | 2,113 | | 2,113 | |
| HOURLY FLOW (m³/h) | 88 | | 88 | |
| CONSTITUENT | CONC (mg/L) | LOAD (kg/d) | CONC (mg/L) | LOAD (kg/d) |
| BOD | 153 | 323 | 63 | 132 |
| COD | 742 | 1,567 | 445 | 940 |
| TSS | 30 | 63 | 30 | 63 |
| TS | 13,437 | 28,395 | 13,437 | 28,395 |
| TKN | 94 | 199 | 10 | 21 |
| NH$_4$—N | 90 | 189 | 8 | 17 |
| NO$_3$—N | 8 | 17 | 72 | 152 |
| TP (as P$_2$O$_5$—P) | 215 | 454 | 19 | 40 |
| Chloride | 3,839 | 8,114 | 3,839 | 8,114 |
| Total Coliform (#/100 mL) | — | — | — | — |
| Fecal Coliform (#/100 mL) | — | — | — | — |

| STREAM | (13) ANOXIC 2 SUPERNATANT | | (14) EFFLUENT | |
|---|---|---|---|---|
| DAILY FLOW (m³/d) | 2,113 | | 1,953 | |
| HOURLY FLOW (m³/h) | 88 | | 81 | |
| CONSTITUENT | CONC (mg/L) | LOAD (kg/d) | CONC (mg/L) | LOAD (kg/d) |
| BOD | 25 | 53 | 12 | 25 |
| COD | 267 | 564 | 87 | 165 |
| TSS | 30 | 63 | 1 | 2 |
| TS | 13,437 | 28,395 | 10,051 | 21,239 |
| TKN | 8 | 17 | 3 | 6 |
| NH$_4$—N | 6 | 13 | 2 | 4 |
| NO$_3$—N | 6 | 13 | 5 | 11 |
| TP (as P$_2$O$_5$—P) | 7 | 15 | 1 | 3 |
| Chloride | 3,839 | 8,114 | 3,839 | 8,114 |
| Total Coliform (#/100 mL) | — | — | 530 | — |
| Fecal Coliform (#/100 mL) | — | — | 212 | — |

| STREAM | (15) DRYER CONDENSATE | | (18) STRIPPED CONDENSATE | |
|---|---|---|---|---|
| DAILY FLOW (m³/d) | 560 | | 560 | |
| HOURLY FLOW (m³/h) | 23 | | 23 | |
| CONSTITUENT | CONC (mg/L) | LOAD (kg/d) | CONC (mg/L) | LOAD (kg/d) |
| BOD | 1,500 | 840 | 1,500 | 840 |
| COD | 6,160 | 3,450 | 4,660 | 2,610 |
| TSS | 0 | 0 | 0 | 0 |
| TS | 200 | 112 | 300 | 158 |
| TKN | 5,240 | 2,934 | 300 | 188 |
| NH$_4$—N | 5,200 | 2,912 | 260 | 146 |
| NO$_3$—N | 0 | 0 | 0 | 0 |
| TP (as P$_2$O$_5$—P) | 20 | 11 | 20 | 11 |
| Chloride | 0 | 0 | 0 | 0 |
| Total Coliform (#/100 mL) | — | — | — | — |
| Fecal Coliform (#/100 mL) | — | — | — | — |

| STREAM | 17) COMBINED CAKE | | (18) UV EFFLUENT | |
|---|---|---|---|---|
| DAILY FLOW | 490 (ton/day) | | 1,953 | |
| HOURLY FLOW | 683 (m³/d) | | 81 (m³/h) | |
| CONSTITUENT | CONC (units as noted) | LOAD (kg/d) | CONC (mg/L) | LOAD (kg/d) |
| BOD | N/A | N/A | 12 | 25 |
| COD | N/A | N/A | 87 | 185 |
| TSS | 853 g/kg DS | 104,551 | 1 | 2 |
| TS | 0 DS | 122,531 | 10,051 | 21,239 |
| TKN | 31 g/kg DS | 3,738 | 3 | 6 |
| NH$_4$—N | 12 g/kg DS | 2,445 | 2 | 4 |
| NO$_3$—N | 0 g/kg DS | 0 | 5 | 11 |
| TP (as P$_2$O$_5$—P) | 57 g/kg DS | 6,945 | 1 | 3 |
| Chloride | 29 g/kg DS | 3,597 | 3,839 | 8,114 |
| Total Coliform (#/100 mL) | — | — | 53 | — |
| Fecal Coliform (#/100 mL) | — | — | 21 | — |

Key to Figures:
Line type:
— Slurry, liquid, or solids stream
- - - Control lines
...... Gas or air lines FIG. 1
Components (Preferred number thereof):

| | | |
|---|---|---|
| A | Bar rack (3) | |
| B | Chopper pumps (3) | |
| C | Macerator (3) | |
| D | Slurry/sludge holding tanks (3) | |
| E | Cationic polymer storage and feeding system (3) | |
| F | In-line mixer (3) | |
| G | Centrifugal decanter (3) | |
| H | Centrate holding tanks (2) | |
| I | Anionic polymer holding and feeding system (2) | |
| J | Liquid alum storage and feeding system (2) | |
| BC | Chemical addition diaphragm pumps, automatic control variable output (10) | |
| BD | Side entry mixers for slurry and centrate storage tanks (15) | |
| BM | Thermal oil heater for cake indirect dryer (3) | |
| BN | Hot oil circulator pump (3) | |
| BO | Indirect cake dryer (3) | |
| BP | Pellet size sorter (3) | |
| BQ | Paddle mixer pelletizer (3) | |
| BR | Dryer water vapour condenser (2) | |
| BS | Solids cake silo (3) | |
| BU | Condenser cooling water circulator pump (2) | |
| BV | Oil heater natural gas burner (3) | |
| FC | Flow element control for chemical feed pumps | |
| LC | Level switch control for submersible chopper pump | |
| NGS | Natural gas supply | |
| OSD | Off site solid waste disposal | |
| OC | Odour control system | |
| PF | Pig farm | |
| PSS | Pellet Storage and shipping | |

Streams:

| | |
|---|---|
| 1 | Raw slurry to bar rack |
| 1-1 | Screened slurry to pumping pit |
| 1-2 | Chopped slurry to macerator |
| 1-3 | Macerated Slurry to storage tank |
| 2 | Waste liquor pumped from MBR aerobic 2 zone to storage tank |
| 2-1 | Liquor withdrawal line from MBR aerobic 2 zone to waste and return pumps |
| 2-2 | Liquor return from MBR aerobic 2 zone to anoxic 1 zone |
| 2-3 | Nitrified liquor return from MBR aerobic 1 zone to anoxic 1 zone |
| 2-4 | Denitrified liquor return from MBR anoxic 1 to anaerobic zone |
| 3 | Float and bottom draw-off sludge waste line from DAFT to storage tank |
| 4 | Excess solids waste line from AFBR to storage tank |
| 5 | Centrifuge feed after polymer addition and mixing. Centrifuge feed combines slurry, waste MBR mixed liquor, excess AFBR solids, and DAFT float and sludge |
| 6 | Centrate from centrifuge to centrate storage tank |
| 6-1 | Centrate after polymer and aluminum sulfate addition pumped to flash mixer and flocculator |
| 15 | Condensate from solids cake dryer indirect condenser to ammonia air stripper |
| 17 | Solids cake out of centrifuge to cake storage silo |
| 21 | Heat recuperation system. Condenser cooling water loop hot side from condenser to DAFT effluent heat exchanger |
| 22 | Heat recuperation system. Condenser cooling water loop cold side from DAFT effluent heat exchanger to condenser |
| 29 | Bar rack screenings to off site solids waste disposal |
| 35 | Ammonium sulfate removed from acid scrubber to paddle mixer pelletizer, for pellet nitrogen fortification |
| 42 | Polymer addition line from metering system to mixer before centrifuge |
| 43 | Polymer addition line from metering system to flash mixer before mechanical flocculator |
| 44 | Aluminum sulfate addition line from metering system to flash mixer before mechanical flocculator |
| 50 | Natural gas supply to thermal oil heating furnace burner. Supplies heat to indirect solids drier |
| 51 | Thermal oil loop hot feed side from oil heater to dyer |
| 52 | Thermal oil loop cold return side from dryer to oil heater |
| 53 | Wet pellet feed elevator from paddle mixer to dryer |
| 54 | Dry pellet from dryer to pellet size sorter |
| 55 | Under size dry pellet return to paddle mixer for wet cake coating |
| 56 | Finished pellet conveyor to cooling, storage and shipping |
| 57 | Water vapour extracted from wet cake, from dryer exhaust to condenser |
| 58 | Thermal oil heater combustion gas exhaust |

FIG. 2
Components (preferred number thereof):

| | |
|---|---|
| K | Rapid mixer/flocculator (2) |
| L | Dissolved air flotation thickeners (DAFT) (2) |
| M | DAFT air saturation tank (2) |
| N | Heat exchanger (2) |
| O | Water heater (1) |
| Q | Air stripper tower (2) |
| R | Wet scrubber tower (2) |
| S | Stripping tower sodium hydroxide storage and feeding system (1) |
| T | Wet scrubber sulfuric acid storage and feeding system (1) |
| U | Sulfuric acid addition, stripped condensate pH control system (1) |
| BA | Fan make-up air addition (1) |
| BB | Fan air recirculation (1) |
| BC | chemical addition diaphragm pumps, automatic control variable output (10) |
| BD | Side entry mixers for slurry and centrate storage tanks (15) |
| BE | Variable speed rapid mixer (2) |
| BF | Variable speed flocculation mixer (2) |
| BG | Pump DAFT effluent recirculation (2) |
| BH | Compressor DAFT recycled effluent saturation (2) |
| BI | Burner natural gas auxiliary water heater (1) |
| BJ | Circulator pump auxiliary hot water system temperature controlled (1) |
| BL | Recirculation pump sulfuric acid solution ammonia scrubber (2) |
| BT | Stripped warm air release dampener valve (1) |
| TC | Temperature element control for hot water recirculation pumps |
| pHC | pH element control for caustic and acid addition diaphragm pumps |
| NGS | Natural gas supply |

Streams:

| | |
|---|---|
| 3 | Float and bottom draw-off sludge waste line from DAFT to storage tank |
| 6-1 | Centrate after polymer and aluminum sulfate addition pumped to flash mixer and flocculator |
| 6-2 | Flocculated centrate to DAFT |
| 7 | DAFT effluent to heat exchanger |
| 7-1 | Heated DAFT effluent to AFBR |
| 15 | Condensate from solids cake dryer indirect condenser to ammonia air stripper |
| 15-1 | Condensate at high pH after sodium hydroxide addition |
| 16 | Air-stripped condensate at high pH |
| 16-1 | Air-stripped condensate after pH neutralization with sulfuric acid to MBR |
| 19 | Hot water loop feed side from auxiliary gas fired water heater to DAFT effluent heat exchanger |

-continued

Key to Figures:
Line type:
— Slurry, liquid, or solids stream
- - - Control lines
...... Gas or air lines

| | |
|---|---|
| 20 | Hot water loop return side from DAFT effluent heat exchanger to auxiliary gas-fired water heater |
| 21 | Heat recuperation system. Condenser cooling water loop hot side from condenser to DAFT effluent heat exchanger |
| 22 | Heat recuperation system. Condenser cooling water loop cold side from DAFT effluent heat exchanger to condenser |
| 23 | Effluent recirculation line from DAFT to air saturation tank |
| 24 | Air-saturated DAFT effluent line from saturation tank to DAFT center well |
| 25 | DAFT bottom sludge draw-off line to storage tank |
| 26 | DAFT float line from DAFT skimmer box to storage tank |
| 27 | Natural gas supply line feeding auxiliary hot water boiler burner |
| 28 | Hot water boiler combustion gas exhaust |
| 30 | Ammonia-laden hot air from air stripper to wet acid scrubber |
| 31 | Acid-scrubbed air return to ammonia air stripper via recirculation fan |
| 32 | Ambient air addition to air loop for temperature control. Supplied by make-up air fan |
| 33 | Ammonia recovery system exhaust air to atmosphere through dampening flow control valve |
| 34 | Sulfuric acid addition to scrubber low pH water recirculating loop |
| 35 | Ammonium sulfate removed from acid scrubber to paddle mixer pelletizer, for pellet nitrogen fortification |
| 36 | Wet scrubber low pH water recirculating loop |
| 45 | Sodium hydroxide addition line from metering system to ammonia stripper condensate feed line |
| 46 | Sulfuric acid addition line from metering system to stripped condensate line feeding MBR |

FIG. 3
Components (preferred number thereof):

| | |
|---|---|
| P | Pre-acidification fluidized bed reactors (FBR) (2) |
| V | Biological nutrient removal (BNR) anaerobic zone (2) |
| W | BNR anoxic I zone (2) |
| X | BNR aerobic I zone (2) |
| AB | Magnesium hydroxide addition, BNR pH and alkalinity control system (2) |
| AC | BNR denitrification methanol storage and feeding system (2) |
| AG | Multi-stage dynamic blower (2) |
| AI | Fine bubble diffusers (2 systems) |
| AL | Mixed liquor return pumps from aerobic II to anoxic I zone (2) and aerobic I to anoxic I zone (2) |
| AK | Top-entry mixers anaerobic, anoxic I and anoxic II zones |
| AV | Mixed liquor return pumps from anoxic I to anaerobic zone (2) |
| AX | FBR excess solids waste pump (2) |
| AZ | FBR effluent recirculation pump (2) |
| BC | Chemical addition diaphragm pumps, automatic control variable output (10) |
| OPRC | Oxidation-reduction potential element control for mixed liquor return pumps |
| pHC | pH element control for caustic and acid addition diaphragm pumps |

Streams:

| | |
|---|---|
| 2-2 | Liquor return from MBR aerobic 2 zone to anoxic I zone |
| 2-3 | Nitrified liquor return from MBR aerobic I zone to anoxic I zone |
| 2-4 | Denitrified liquor return from MBR anoxic I to anaerobic zone |

-continued

Key to Figures:
Line type:
— Slurry, liquid, or solids stream
- - - Control lines
...... Gas or air lines

| | |
|---|---|
| 4 | Excess solids waste line from AFBR to storage tank |
| 7-1 | Heated DAFT effluent to AFBR |
| 8 | AFBR acidified effluent to MBR |
| 8-1 | AFBR effluent recirculation line for bed fluidization |
| 9 | MBR feed combining AFBR acidified effluent and air-stripped condensate |
| 10 | Mixed liquor flow from MBR anaerobic to anoxic I zone. Line is for illustration only, in actuality all zones are in the same tank, separated with baffles |
| 11 | Mixed liquor flow from MBR anoxic I to aerobic I zone. Line for illustration only |
| 12 | Mixed liquor flow from MBR aerobic I to anoxic II zone. Line for illustration only |
| 16-1 | Air-stripped condensate after pH neutralization with sulfuric acid to MBR |
| 36 | Wet scrubber low pH water recirculating loop |
| 37 | Air duct from MBR anaerobic zone to odour control scrubbers |
| 38 | Air duct from MBR aerobic I zone to odour control scrubbers |
| 40 | Air line from multi-stage dynamic blower discharge to MBR aerobic I zone fine bubble diffuser system |
| 47 | Magnesium hydroxide alkalinity addition line from metering system to MBR nitrification aerobic I zone |
| 48 | Methanol addition line from metering system to MBR pre-denitrification anoxic I zone |
| 49 | Methanol addition line from metering system to MBR post-denitrification anoxic II zone |
| 59 | Air duct from MBR anoxic I zone to odour control scrubber |
| 62 | Air duct from AFBR to odour control scrubbers |

FIG. 4
Components (preferred number thereof):

| | |
|---|---|
| Y | BNR anoxic II zone (2) |
| Z | BNR aerobic II zone (4) |
| AA | BNR submerged membrane cases with incorporated diffusers (24) |
| AD | Liquid alum storage and feeding system (2) |
| AE | Ultraviolet disinfection system (2) |
| AF | Disinfected effluent storage tank (1) |
| AH | Positive displacement lobe blower (2) |
| AJ | Coarse bubble diffusers (24) |
| AK | Top-entry mixers anaerobic, anoxic I and anoxic II zones |
| AY | On site effluent reuse pumping system (2) |
| BC | Chemical addition diaphragm pumps automatic control variable output (10) |
| BK | Waste biomass pump aerobic II zone to slurry/sludge holding tanks (2) |
| OC | Odour control system |

Streams:

| | |
|---|---|
| 2 | Waste liquor pumped from MBR aerobic II zone to storage tank |
| 2-1 | Liquor withdrawal line from MBR aerobic II zone to waste and return pumps |
| 2-2 | Liquor return from MBR aerobic II zone to anoxic I zone |
| 4 | Excess solids waste line from AFBR to storage tank |
| 12 | Mixed liquor flow from MBR aerobic I to anoxic II zone. Line for illustration only |
| 13 | Mixed liquor flow from MBR anoxic II to aerobic II zone. Line for illustration only |
| 14 | Permeate out of membranes flowing to UV radiation units |
| 15 | Condensate from solids cake dryer indirect condenser to ammonia air stripper |

-continued

Key to Figures:
Line type:
— Slurry, liquid, or solids stream
- - - Control lines
...... Gas or air lines

| | |
|---|---|
| 18 | Disinfected permeate from UV units to effluent storage tank |
| 18-1 | Pumped effluent for on-site reuse |
| 18-2 | Effluent overflow to discharge |
| 39 | Air duct from MBR aerobic II zone to odour control scrubbers |
| 41 | Air line from lobe-type positive displacement blower discharge to MBR aerobic II zone coarse bubble diffuser system |
| 49 | Methanol addition line from metering system to MBR post-denitrification anoxic II zone |
| 60 | Air duct from MBR anoxic II zone to odour control scrubbers |
| 61 | Aluminum sulfate addition line from chemical metering system to anoxic II zone |

References

Barnes, David and P. J. Bliss. 1983. *Biological Control of Nitrogen in Wastewater Treatment*. London: F&N Spon.

Benitez, Juan et al. 1995. "Stablization and Dewatering of Wastewater Using Hollow-Fiber Membranes", *Bioengineering* (69): 178–83.

Bouhabila, E. H. 1998. "Microfiltration of Activated Sludge Using Submerged Membrane with Air Bubbling", *Desalination* (118): 315–22.

Churchouse, Steve and Duncan Wildgoose. 2000. "Membrane Bioreactors Hit the Big Time: From Lab to Full Scale Application". Bristol (UK): MBR Technology Paper.

Environmental Protection Agency. 1987. Design Manual: Phosphorus Removal. EPA/625/1-87/001. Cincinnati: Center for Environmental Research Information.

Environmental Protection Agency. 1993. Manual: Nitrogen Control. EPA/625/R-93-010. Cincinnati: Center for Environmental Research Information.

Ishida, H. et al. 1993. "Submerged Membrane Activated Sludge Process: Its Application into Activated Sludge Process with High Concentration of MLSS", presented at the $2^{nd}$ International Conference on Advances in Water and Effluent Treatment. A BHR Group Series publication (8): p.321–30.

Levenspiel, O. 1995. *Chemical Reaction Engineering*. New York: John Wiley and Sons, Inc.

Metcalf and Eddy Inc. 1991. *Wastewater Engineering*, $3^{rd}$ ed. New York: McGraw-Hill.

Mishra, P. N. et al. 1996. "Industrial Wastewater Biotreatment Optimization through Membrane Applications", presented at the $89^{th}$ Annual Meeting Air & Waste Management Association, Nashville, Tenn., June.

Nagano, H. 1999. "Nitrogen Removal by Submerged Membrane Separation Activated Sludge Process", *Water Science Technology* (39): 107–14.

Reid, John H. and J. Arthur Riddick. 2001. "Application of Modified Badenpho Wastewater Treatment Process to the Poultry Industry", Fredericksburg: A Reid Engineering Company Paper for WEFTEC.

Stephenson, Tom et al. 2000. *Membrane Bioreactors for Wastewater Treatment*. London: IWA Publishing.

Water Environment Federation. 1998. *Biological and Chemical Systems for Nutrient Removal*. Alexandria: WEF Publication.

Yeoman, S. et al. 1988. "The Removal of Phosphorus During Wastewater Treatment: A Review", *Environmental Pollution* (49): 183–233.

"Continuous process for the preparation of fertilizers from animal waste", Baccarani, U.S. Pat. No. 5,282,879: February 1994.

"Apparatus and process for forming uniform, pelletizable sludge product", Dausman, et al., U.S. Pat. No. 4,872,998: October 1989.

"Constructed wetlands remediation system", Dufay, U.S. Pat. No. 6,159,371: December 2000.

"Biological nutrient removal with sludge bulking control in a batch activated sludge system", Goronszy, U.S. Pat. No. 5,013,441: May 1991.

"System and process for treating animal waste", Greene, et al., U.S. Pat. No. 6,117,324: September 2000.

"Use of fluidized bed reactors for treatment of wastes containing nitrogen compounds", Heitkamp et al., U.S. Pat. No. 5,540,840: July 1996.

"Treatment of wastes", Henry, U.S. Pat. No. 5,397,474: March 1995.

"Microbiological method for disposing of organic waste materials", Higa, U.S. Pat. No. 5,707,856: January 1998.

"Apparatus and methods for wastewater treatment from high volume livestock production", Hoffland, et al., U.S. Pat. No. 6,054,044: April 2000.

"Method and apparatus for waste water purification", Horiguchi et al., U.S. Pat. No. 3,547,816: December 1970.

"Apparatus for treating activated sludge and method of cleaning it", Ishida et al., U.S. Pat. No. 5,192,456: March 1993.

"Waste treatment process", Jeris, U.S. Pat. No. 4,009,098: February 1977.

"Biological fluidized bed apparatus", Josse et al., patent-pending: U.S. Ser. No. 09/839,653: November 2000.

"Method and apparatus for fluidization of particulate bed materials", Khudenko, U.S. Pat. No. 6,048,459: April 2000.

"Apparatus for clarification of water", Krofta U.S. Pat. No. 4,626,345: December 1986.

"Organic waste processing method and uses thereof", Lasseur et al., U.S. Pat. No. 6,077,548: June 2000, "Electrochemical treatment of water contaminated with nitrogenous compounds", Lin et al., U.S. Pat. No. 6,083,377: July 2000.

"Process for biologically removing phosphorus and nitrogen from wastewater by controlling carbohydrate content therein", Liu, et al., U.S. Pat. No. 5,833,856: November 1998.

"Method of treating animal waste", Lloyd, U.S. Pat. No. 6,083,386: July 2000.

"Sludge treatment system", Lyman et al., U.S. Pat. No. 5,279,637: January 1994.

"Vertical skein of hollow fiber membranes and method of maintaining clean fiber surfaces while filtering a substrate to withdraw a permeate", Mahendran et al., RE U.S. Pat. No. 37,549: February 2002.

"Enhanced denitrification process by monitoring and controlling carbonaceous nutitnent addition", Maneshin et al., U.S. Pat. No. 6,106,718: August 2000.

"Psychrophilic anaerobic treatment of waste in a sequencing semibatch/batch bioreactor", Masse et al., U.S. Pat. No. 5,863,434: January 1999.

"Biological removal of phosphorus and nitrogent from wastewater using a stressed contact zone and luxury contact zone", Miller, U.S. Pat. No. 5,603,833: February 1997.

"Methods of treating animal waste slurries", Moore, U.S. Pat. No. 6,346,240: February 2002.

"Cassette membrane system and method of use for low pressure separations", Moller, U.S. Pat. No. 5,620,605: April 1997.

"Stacked filter cartridge with porous filter support", Naruo et al., U.S. Pat. No. 4,871,456: October 1989.

"Waste water treatment apparatus ad washing method thereof", Ohtani et al., U.S. Pat. No. 5,690,830: November 1997.

"Immersed membrane element and module", Pedersen et al., U.S. Pat. No. 6,325,928: December 2001.

"Sludge dryer", Ratajczek, U.S. Pat. No. 5,561,917: October 1996.

"Waste treatment with a combination of denitrifying propionibacterium acidipropionici and protease-producing bacillus", Rehberger, U.S. Pat. No. 6,221,650: April 2001.

"Method of clarifying proteinaceous waste water containing solid impurities", Roets, U.S. Pat. No. 4,559,146: December 1985.

"Method for the removal of nutrients containing carbon, nitrogen and phosphorus", Rogalla, U.S. Pat. No. 5,605,629: February 1997.

"Process for sludge and/or organic waste reduction", Rozich, U.S. Pat. No. 5,141,646: August 1992.

"Process for the secondary treatment of wastewater", Severeid, et al., U.S. Pat. No. 4,374,027: February 1983.

"Aerobic biodegradable waste treatment system for large scale animal husbandry operations", Sheaffer, U.S. Pat. No. 6,136,185: October 2000.

"Water treatment system", Sherman, U.S. Pat. No. 5,389,254: February 1995.

"Filtration membrane module", Shimizu et al., U.S. Pat. No. 5,482,625: January 1996.

"Waste treatment device and method employing the same", Spears, et al., U.S. Pat. No. 6,139,744: October 2000.

"Process and system for treatment of pig and swine manure for environmental enhancement", Tetrault et al., U.S. Pat. No. 5,885,461: March 1999.

"Sludge treatment apparatus", Wang et al., U.S. Pat. No. 5,068,031: November 1991.

"Ozone disinfecting, decontaminating and deodorizing of animal manure", Wasinger, U.S. Pat. No. 6,056,885: May 2000.

"Sludge treatment membrane apparatus", Wataya et al., U.S. Pat. No. 5,651,889: July 1997.

"Hog waste processing apparatus and method", White, U.S. Pat. No. 6,207,057: March 2001.

"Processing for treating organic wastes", Winter et al., U.S. Pat. No. 5,277,814: January 1994.

"Hollow fiber membrane module", Yamanori et al., U.S. Pat. No. 5,480,553: January 1996.

"Membrane treatment and membrane treatment apparatus", Yamato et al., U.S. Pat. No. 6,224,766: May 2001.

"Process for high concentrated waste water treatment using membrane separation", Yoo et al., U.S. Pat. No. 6,007,719: December 1999.

What is claimed is:

1. A process for treating an organic slurry comprising a mixture of solids suspended in a liquid, colloidal solids and dissolved pollutants including nitrogen, phosphorus and organic matter, the process comprising:

flocculating a slurry stream with anionic polymer or a coagulant, or both, to aggregate suspended and colloidal solids into a floc, to form a flocculated steam;

removing flocs from the flocculated stream to form a deflocced stream;

feeding the deflocced stream into a biomass concentration suspended growth system to remove biologically at least a portion of the organic and inorganic nitrogen, and remove by biological luxury uptake at least a portion of the phosphorus, wherein the system comprises:

a multi-stage sequence of an anaerobic zone, an anoxic zone, and an aerobic zone, each zone separated with baffles, operating in a biomass recycle pattern from the anoxic zone to the anaerobic zone, and from the aerobic zone to the anoxic zone, with biomass wastage from the aerobic zone; and microfiltration membranes to filter liquid out of the aerobic zone to form a low-turbidity permeate.

2. The process according to claim 1 wherein when the deflocced stream is not readily biodegradable the process further comprises treating the deflocced stream with hydrolyzing and acidogenic anaerobic bacteria in a fluidized bed reactor to hydrolyze at least a portion of volatile solids and acidify at least a portion of dissolved organic matter into volatile fatty acids, to form a hydrolyzed acidified deflocced stream, before feeding to the high biomass concentration suspended growth system.

3. The process according to claim 2 further comprising heating the deflocced stream to a mesophilic temperature before treating the deflocced stream in the fluidized bed reactor.

4. The process according to claim 3 wherein the deflocced stream is heated by passing it through indirect heat exchangers.

5. The process according to claim 1 wherein the biomass concentration suspended growth system comprises:

a five-stage sequence of anaerobic, anoxic 1, aerobic 1, anoxic 2, and aerobic 2 zones operating with a biomass recycle pattern from anoxic 1 to anaerobic zone, from aerobic 1 to anoxic 1 zone, and from aerobic 2 to anoxic 1 zone, with biomass wastage from aerobic 2 zone; and the microfiltration membranes filter liquid out of aerobic 2 zone to form the low-turbidity permeate.

6. The process according to claim 5, wherein at least a portion of the phosphorus that is not removed biologically is removed chemically and physically with the addition of alum, ferric chloride or polyaluminum chloride into anoxic 2 zone, to produce phosphate salts that precipitate into microflocs retained by the microfiltration membranes filtering out of aerobic 2 zone.

7. The process according to claim 1 further comprising passing the low-turbidity permeate through an ultraviolet radiation chamber for disinfection.

8. The process according to claim 1 wherein the organic slurry is an animal manure slurry.

9. The process according to claim 1 wherein the slurry stream is flocculated in a flocculator with addition of anionic polymer and alum as coagulant.

10. The process according to claim 1 wherein the flocs are removed from the flocculated stream by passing the flocculated steam through a dissolved air flotation thickener with introduction of fine air bubbles.

11. The process according to claim 1 wherein the organic slurry is wastewater comprising a concentration of solids suspended in the liquid, and the wastewater is used as the slurry steam.

12. The process according to claim 1 wherein the organic slurry comprises a concentration of solids suspended in the liquid, and the process further comprises separating the organic slurry into a solids fraction comprising a majority of the solids and a liquids fraction comprising a minority of the solids suspended in the liquid, and the liquids fraction is used as the slurry stream.

13. The process according to claim 12 wherein the organic slurry is separated with a centrifugal decanter.

14. The process according to claim 12, wherein the solids fraction in the form of a cake is heat-dried in a heat-drying system and pelletized in a pelletizer to produce an organo-mineral fertilizer for agricultural and horticultural applications.

15. The process according to claim 14 wherein the flocs are removed from the flocculated stream by passing the flocculated stream through a dissolved air flotation thickener, and water vapour produced in the heat-drying system is condensed in an indirect heat exchanger, and the heat of condensation recovered to warm the deflocced stream as it exits the dissolved air flotation thickener.

16. The process according to claim 14, wherein hot condensate produced in the heat-drying system is subjected to air stripping at high pH with added caustic to remove ammonium-nitrogen, and the ammonia-laden air is subjected to wet acid scrubbing at low pH with added sulphuric acid or phosphoric acid to recuperate ammonia in the form of a concentrated solution of ammonium sulphate or ammonium phosphate.

17. The process according to claim 16, wherein ammonium sulphate or ammonium phosphate is added into the pelletizer to increase the nitrogen and/or phosphorus content of the fertilizer pellet.

* * * * *